(12) United States Patent
Hamilton

(10) Patent No.: US 11,777,614 B2
(45) Date of Patent: Oct. 3, 2023

(54) QUANTUM COMMUNICATION TRANSCEIVER BASED ON QUANTUM ENTANGLED ATOMIC STATES

(71) Applicant: Hughes Network Systems, LLC, Germantown, MD (US)

(72) Inventor: Darren Scott Hamilton, Castle Rock, CO (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/553,413

(22) Filed: Dec. 16, 2021

(65) Prior Publication Data

US 2022/0263585 A1     Aug. 18, 2022

Related U.S. Application Data

(60) Provisional application No. 63/149,854, filed on Feb. 16, 2021.

(51) Int. Cl.
*H04B 10/2575*     (2013.01)
*H04B 10/70*     (2013.01)
(Continued)

(52) U.S. Cl.
CPC ............ *H04B 10/70* (2013.01); *H01Q 5/22* (2015.01); *H01Q 13/00* (2013.01); *H04B 10/00* (2013.01);
(Continued)

(58) Field of Classification Search
CPC .. H04B 10/70; H04B 10/114; H04B 10/2575; H04B 10/00; H04B 10/503; H04B 2210/006; H01Q 5/22; H01Q 13/00
(Continued)

(56) References Cited

U.S. PATENT DOCUMENTS

| 6,265,945 B1* | 7/2001 | Delaney | G04F 5/145 |
| | | | 331/3 |
| 10,979,147 B2* | 4/2021 | Gordon | H04B 10/503 |

(Continued)

OTHER PUBLICATIONS

Ryu et al, All order dispersion cancellation and energy time entangled state, Jan. 2017, Optics Express, All Document. (Year: 2017).*

(Continued)

*Primary Examiner* — Dibson J Sanchez
(74) *Attorney, Agent, or Firm* — MANNAVA & KANG, PC; George Y. Wang

(57) ABSTRACT

A system for a Rydberg atom based quantum communications transceiver is provided. The system may include a laser source for generating a photon. The system may also include one or more optical elements to create a pair of entangled photons from a generated photon, wherein the pair of entangled photons comprises a first entangled photon and a second entangled photon. The system may further include a radio-frequency (RF) based element to generate a quantum communication path from the pair of entangled photons by creating two Rydberg atom vapor cells (RAVC) that are entangled such that entangled photons may transfer or communicate their entangled state to Rydberg atoms within the Rydberg atom vapor cells (RAVCs) and form at least one entangled link with the other, the communication path comprising the least one entangled link. The system may also include one or more photon receivers, which may use at least one translation technique, to translate entangled state of each of the Rydberg atom vapor cells (RAVC).

14 Claims, 5 Drawing Sheets

(51) Int. Cl.
*H01Q 13/00* (2006.01)
*H01Q 5/22* (2015.01)
*H04B 10/50* (2013.01)
*H04B 10/00* (2013.01)

(52) U.S. Cl.
CPC ........ *H04B 10/2575* (2013.01); *H04B 10/503* (2013.01); *H04B 2210/006* (2013.01)

(58) Field of Classification Search
USPC .................................. 398/115–117, 182–201
See application file for complete search history.

(56) References Cited

U.S. PATENT DOCUMENTS

| | | | |
|---|---|---|---|
| 11,165,505 B2* | 11/2021 | Gordon | H01Q 1/366 |
| 2004/0264958 A1* | 12/2004 | Zoller | H04B 10/70 |
| | | | 398/40 |
| 2007/0030971 A1* | 2/2007 | Sun | H04B 10/70 |
| | | | 380/255 |
| 2013/0266328 A1* | 10/2013 | Paller | H04B 10/25 |
| | | | 398/135 |
| 2018/0373118 A1* | 12/2018 | Kiffner | G02F 1/3536 |
| 2019/0334537 A1* | 10/2019 | Zhang | G04F 5/145 |
| 2020/0292606 A1* | 9/2020 | Holloway | G01R 29/0892 |
| 2022/0196716 A1* | 6/2022 | Anderson | G01R 29/0892 |

OTHER PUBLICATIONS

Song et al, Rydberg atom based digital communication using a continuously tunable radio frequency carrier, Mar. 2019, Optics Express, All Document. (Year: 2019).*

* cited by examiner

QUANTUM COMMUNICATION TRANSCEIVER BASED ON QUANTUM ENTANGLED ATOMIC STATES

TECHNICAL FIELD

This patent application is directed to communication systems, and more specifically, to systems and methods for providing a communication transceiver based on quantum entangled atomic states.

BACKGROUND

Advances in telecommunications technologies are providing users with more access to voice and data services. Communication systems may be used to provision voice and data services over a variety of networks. However, communication systems must adapt to increasing consumer and enterprise demand. This demand includes providing more data transmission at higher speeds with greater reliability and less latency and improved security.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1A:
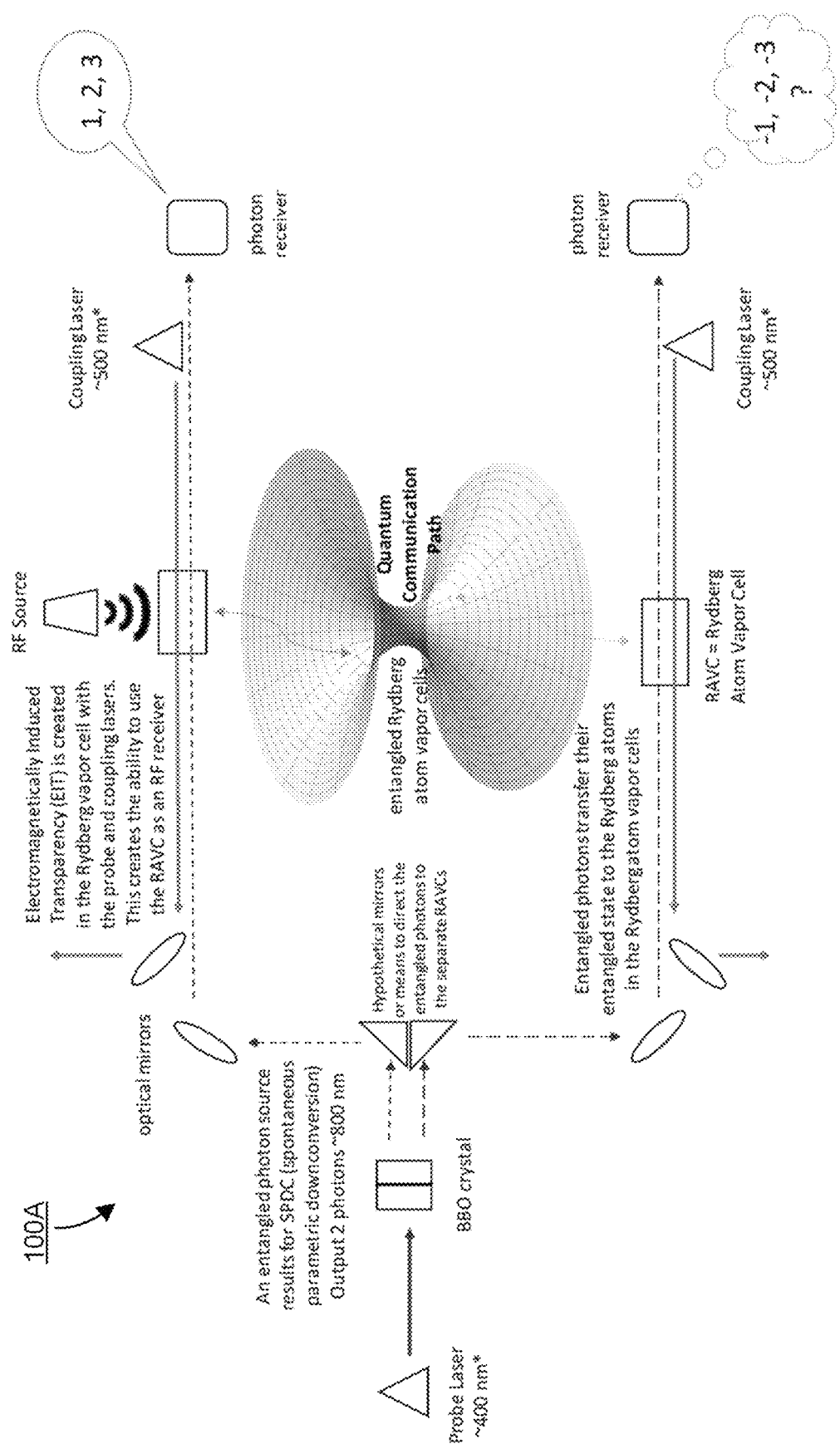
FIGS. 1A-1B illustrate a system for communication using quantum entangled atomic states, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, communication systems must adapt to increasing consumer and enterprise demand. To meet such demand, communication systems are looking to find new and novel solutions for improved data transmission and to provide greater broadband capacities at higher data transfer rates and with greater reliability and less latency and improved security.

Broadband communication generally refers to high-speed Internet access, as opposed to a slower traditional dial-up access. According to the Federal Communications Commission (FCC), broadband may include, but not limited to, several high-speed transmission technologies such as: (1) Digital Subscriber Line (DSL); (2) Cable Modem; (3) Fiber; (4) Wireless; (5) Satellite; and (6) Broadband over Powerlines (BPL). The broadband technology that suits one consumer may be different for another, and may depend on a variety of factors, such as location, availability, cost, and other packaged or bundled services. A description of each of these various broadband technologies will be helpful to highlight the new and novel features and function of the systems and methods described herein, which provide a communication transceiver based on quantum entangled atomic states.

DSL may be a wireline transmission technology that transmits data faster over traditional copper telephone lines already installed to homes and businesses. DSL-based broadband provides transmission speeds ranging from several hundred Kbps to millions of bits per second (Mbps). The availability and speed of your DSL service may depend on the distance from your home or business to the closest telephone company facility. Some common types of DSL transmission technologies may include: Asymmetrical Digital Subscriber Line (ADSL), Symmetrical Digital Subscriber Line (SDSL), High data rate Digital Subscriber Line (HDSL), and Very High data rate Digital Subscriber Line (VDSL).

Cable modem service may enable cable operators to provide broadband using same coaxial cables that deliver pictures and sound to a television set. Most cable modems may be external devices that generally have two connections: one to the cable wall outlet, the other to a computer. They provide transmission speeds of 1.5 Mbps or more.

Subscribers can access their cable modem service by simply turning on their computers, without dialing-up an ISP. You can still watch cable TV while using it. Transmission speeds vary depending on the type of cable modem, cable network, and traffic load. Speeds are comparable to DSL.

Fiber-optic technology may be another broadband technology that has recently increased in popularity. Fiber-optic technology may be based on converting electrical signals, which carrying data, into light and sending the light through transparent glass or optical fibers. These optical fibers, which can be the same thickness has a strand of hair, transmits data at speeds far exceeding current DSL or cable modem speeds, typically by tens or even hundreds of Mbps.

Actual speed may vary depending on a variety of factors, such as proximity of a computing device to the fiber, how a service provider configures the service, and/or amount of bandwidth shared on that fiber. It should be appreciated that fiber-optic technology may also allow simultaneously delivery of voice (VoIP) and video services, including video-on-demand, etc. Telecommunications providers, however, may sometimes offer fiber broadband in limited areas because optical fibers must physically be installed in order to provision such service. Variations of the technology may run the fiber all the way to a customer premise, a curbside, or a location somewhere between the provider's facilities and the customer.

Wireless broadband may also connect a home or business to the Internet. This may be achieved by using a radio link. Wireless broadband may have the flexibility of being mobile or fixed. Unlike DSL, cable, or fiber technologies, wireless technologies using longer-range directional equipment provide broadband service in remote or sparsely populated areas where DSL, cable modem service, or fiber services would be costly to provide. Wireless speeds may be comparable to DSL and cable modern, although modern wireless technology has advanced sufficiently in recent years such that speeds may be approaching or surpassing fiber speeds, such as LTE and 5G services.

Devices that utilize wireless communications may typically require some sort of antenna to receive/transmit data. Wireless broadband Internet access services offered over fixed networks may also allow consumers to access the Internet from a fixed point while stationary and often require a direct line-of-sight between the wireless transmitter and receiver. Mobile wireless broadband services may also be available from mobile telephone service providers and others.

Satellite communications may be another popular option among consumers. Just as satellites orbiting the earth provide necessary links for telephone and television service, they may also provide links for broadband. Satellite broadband is another form of wireless broadband, and is also useful for serving remote or sparsely populated areas. Downstream and upstream speeds for satellite broadband may depend on several factors, including, but not limited to, a provider and service package purchased, a consumer's line of sight to the orbiting satellite, and weather.

Broadband over Powerline (BPL) may deliver broadband over an existing low- and medium-voltage electric power distribution network. BPL speeds may be comparable to DSL and cable modem speeds. BPL may be provided to customers using existing electrical connections and outlets. BPL may be an emerging technology that is available in very limited areas and may have significant potential because power lines are installed virtually everywhere, alleviating the need to build new broadband facilities for every customer.

Many broadband solutions build or expand upon any one of these aforementioned technologies with the goal of increasing data transmission capacities, speeds, reliability, and security. However, the systems and methods described herein provide a communication transceiver based on quantum entangled atomic states.

A transceiver, as used herein, may refer to any device, system, or element capable of receiving and/or transmitting data. This data may be received or transmitted wirelessly or via any type of wire, cable, or data transmission line. As described herein, the communication transceiver may use quantum entangled atomic states to communicate information, which may create an entire new family of data communication systems for any number of applications and uses. More specifically, the systems and methods described herein may provide a communication transceiver that uniquely employs several quantum effects.

The Einstein Podesky Rosen (EPR) Paradox, also known as a "spooky action at a distance," may refer to a phenomenon that describes interactions between entangled particles. In quantum physics, such interactions may exist and appear to be instantaneous. Although it is generally accepted that information cannot travel faster than light, the logic of several quantum concepts, when organized together and described herein, may provide a new family of solutions with applications for improved data communications. These solutions may be based on entangled particles, in accordance with principles espoused by the EPR paradox. For example, these may include, but not limited to: (1) quantum entangled atomic states ("spooky action at a distance"); (2) Rydberg atom vapor cells for reception and transmission of radio frequency (RF) signals; and (3) transfer of quantum states to atoms via an entangled photon source.

A communication transceiver may transmit data based on entangled quantum principles, and in particular, the communication transceiver described herein may expand on or leverage at least the use of Rydberg atom vapor cells (RAVCs). A Rydberg atom vapor cell, as used herein, may be understood to refer to a sealed optically transparent container, such as glass, filled with Rydberg atoms, which may include, but not limited to, cesium or rubidium (alkali metals) as an example. In essence, use of Rydberg atom vapor cells (RAVCs) as wide band RF receivers may be incorporated to systems and methods for the transferring of entangled quantum states from an entangled photon source, which in this case, may also double as a probe laser in this configuration. In other words, this may be a notional way to entangle two spatially distanced Rydberg atom vapor cells, even though other methods or techniques may also be provided.

FIG. 1A illustrates a system 100A using quantum entangled atomic states to communicate information, according to an example. As shown, there may be an entangled photon source, which may include a probe laser (~400 nm). The entangled photon source may also include a nonlinear crystal such as BBO beta barium borate for SPDC (spontaneous parametric down-conversion). In some examples, limitations for entangled photon coherence technology distance may be ~100 km via fiber optic path. In some examples, free space photon entanglement may be demonstrated via satellite. Other various parameters may or may not be provided. Additional details for creating entangled photons may be outlined in "Spontaneous Parametric Down-Conversion" by Christophe Couteau, University of Technology of Troyes, Light, Nanotechnologies & Nanomaterials (L2n), ICD CNRS, 12 rue Marie Curie, 10000 Toyes, France (2018), which is herein incorporated in its entirety.

Referring back to FIG. 1A, the system 100 may split the light or signal (e.g., photons) from the entangled photon source to a first photon receiver and a second photon receiver. This may be achieved using any number of optical, digital, or analog elements (e.g., crystals), including lasers, probes, and/or RF horns, as shown. In some examples, the primary photon source may be a pump laser, which may be used to emit photons into a BBO (barium-borate) crystal, that through spontaneous parametric down conversion due to the crystal's optical properties, may result in emission of two photons at a longer wavelength from a single photon at shorter wavelength. In other words, the photons may be split into pairs of entangled photons. Subsequently these entangled photon pairs may be directed in different directions to two spatially separated Rydberg atom vapor RAVCs). In some examples, this may be achieved either via fiber-optic or free-space pathways. In addition, the spatially-separated entangled photons may arrive at their respective RAVC and transfer their entangled state to the atoms within the cells. In some examples, a radio-frequency (RF) horn, as shown, may be utilized as a way to transmit digitally-encoded radio frequency signals into the "transmitting" RAVC. The RF signals may then disturb excitation states of the of the transmitting Rydberg atoms. By virtue of entanglement principles, this excitation may change the states of the entangled Rydberg atoms in the spatially distant "receiving" RAVC, thereby modulating the probe lasers output, which may help create at least one quantum communication path for the entangled Rydberg atom vapor cells, as shown.

It should be appreciated that at least three quantum principles are demonstrated, which when applied in concert as shown in FIG. 1A, may create an entangled quantum communication device using RAVCs. In summary, the probe laser and nonlinear crystal may be utilized to create entangled photons using spontaneous parametric down conversion (SPDC). The two streams of entangled photons may then be routed to spatially separate RAVCs to excite and transfer their entangled state to the atoms within the RAVCs, thus creating the EPR paradox link between the RAVCs. Lastly, using RAVCs as quantum RF energy sensors, an RF source (or other similar source) may be applied to disturb the entangled atoms in one RAVC. This may both collapse the entangled state for Rydberg atoms in the transmitting RAVC and modulate the probe laser to the local photon detector (e.g., via Electromagnetically Induced Transparency (EIT)). In doing this, the receiving RAVC entangled atoms may instantaneously experience the same collapse of the entangled state for the transmitting Rydberg atoms and may similarly modulate the receiving probe laser stream for its local receiver photon detector thereby transmitting, in essence, a translatable understanding of the data or information via the quantum communication path.

Fundamentally, it should be appreciated that in quantum physics, entangled particles remain connected so that actions performed on one affect the other, even when separated by great distances. The rules of quantum physics state that an unobserved photon exists in all possible states simultaneously but, when observed or measured, exhibits only one state. In some examples, spin may be depicted here as an axis of rotation, but actual particles may not rotate. Entanglement may occur when a pair of particles, such as photons, interact physically. Thus, when a laser beam is fired through a certain type of crystal or other element, for example; it may cause individual photons to be split into pairs of entangled photons. The photons may be separated by a large distance; e.g., hundreds of miles or even more, yet may still remain "entangled."

Referring back to system 100A, the two Rydberg atom vapor cells may be entangled at a distance using entangled photons from an optical pump probe laser, for instance, at an equivalent frequency to predetermined wavelengths used for the existing Rydberg e-field sensors or the like. The entangled photons may then transfer their entangled state to the Rydberg atoms in the vapor cells. Having two spatially separated Rydberg atom vapor cells that are entangled may provide one or more key functionalities to this novel approach to data communication. Since the two spatially separated Rydberg atom vapor cells are separated, they may remain "entangled" and therefore are in communication with each other via a quantum communication path.

When observed, a first entangled photon (top), for example, may take on an up-spin state. The second entangled photon (bottom), though now far away, may take up a state relative to that of the first entangled photon, which in this case, may be a down-spin state. Thus, in some examples, a quantum communication path of the entangled pairs may be created, where the first entangled photon (first Rydberg atom vapor cell) may be shown at a first photon receiver with first set of data (e.g., 1, 2, 3 . . . ) and a second entangled photon (second Rydberg atom vapor cell) may be shown at the second photon receiver with a second set of data, which in some examples, may be an inverse of the first set of data (e.g., −1, −2, −3 . . . ). In some instances, the second set of data may not be a facsimile or inverse, but some translatable understanding of the first set of data.

It should be appreciated that the transfer of state between the first entangled photon and the second entangled photon, as shown in FIG. 1A, may take place instantaneously (or appear instantaneously), regardless of distance. According to the conservation of energy, input photon energy may equal output photon energy. So an input photon ½ wavelength of 400 nm may result in two photons each at 800 nm (SPDC). The entangled photons may be respectively absorbed by the Rydberg atoms in the spatial separated Rydberg atom vapor cells imparting their entangled characteristics upon the atoms, Additional details for highlighting experimentation for photon-to-atom quantum state transfer may be outlined in "Experimental Protocol for High-Fidelity Heralded Photon-to-Atom Quantum State Transfer" by Christoph Kurz et al., Universität des Saarlandes, Experimentalphysik, Campus E2 6, 66123 Saarbrucken, Germany (10 Oct. 2014), which is herein incorporated in its entirety.

In some examples, it should be noted that the entangled photon pump probe laser may be held at a constant output in order to maintain entanglement between the Rydberg atom vapor cells. Furthermore, the entangled photon pump probe laser may be linked via fiber optic or free space optical paths, as shown. In this scenario, each Rydberg atom vapor cell may also have an independent coupling laser that assists in enhancing the probe laser and maintaining coherence of the atomic states within the local RAVC. In some examples, the separate coupling lasers may be at the same wavelength, but in this iteration, the source may differ. It should be appreciated that using the coupling laser as an entangled photon source may be achieved with a single laser and similarly linked via fiber optic or free space optical paths like the probe laser. However, in other examples, they may be separated.

Thus, when microwave RF energy is applied to one Rydberg atom vapor cell (transmitter) with entangled atoms, the other Rydberg cell (receiver) via "spooky action at a distance" may experience the changes in the entangled atomic states of the "transmitter" Rydberg atom vapor cell, possibly at an inverse relationship (e.g., opposite polarization or spin), as described above. In other words, the "receive" Rydberg atom vapor cell probe photon-detector may detect the changes in the atomic states of the Rydberg atoms and translate that to a signal originated on the "transmitting" Rydberg cell. It is possible the "receive" side photodetector may need to be adjusted to accommodate the opposite or inverse signal results to be able to translate the data from the originating RF signal.

Figure 1B:
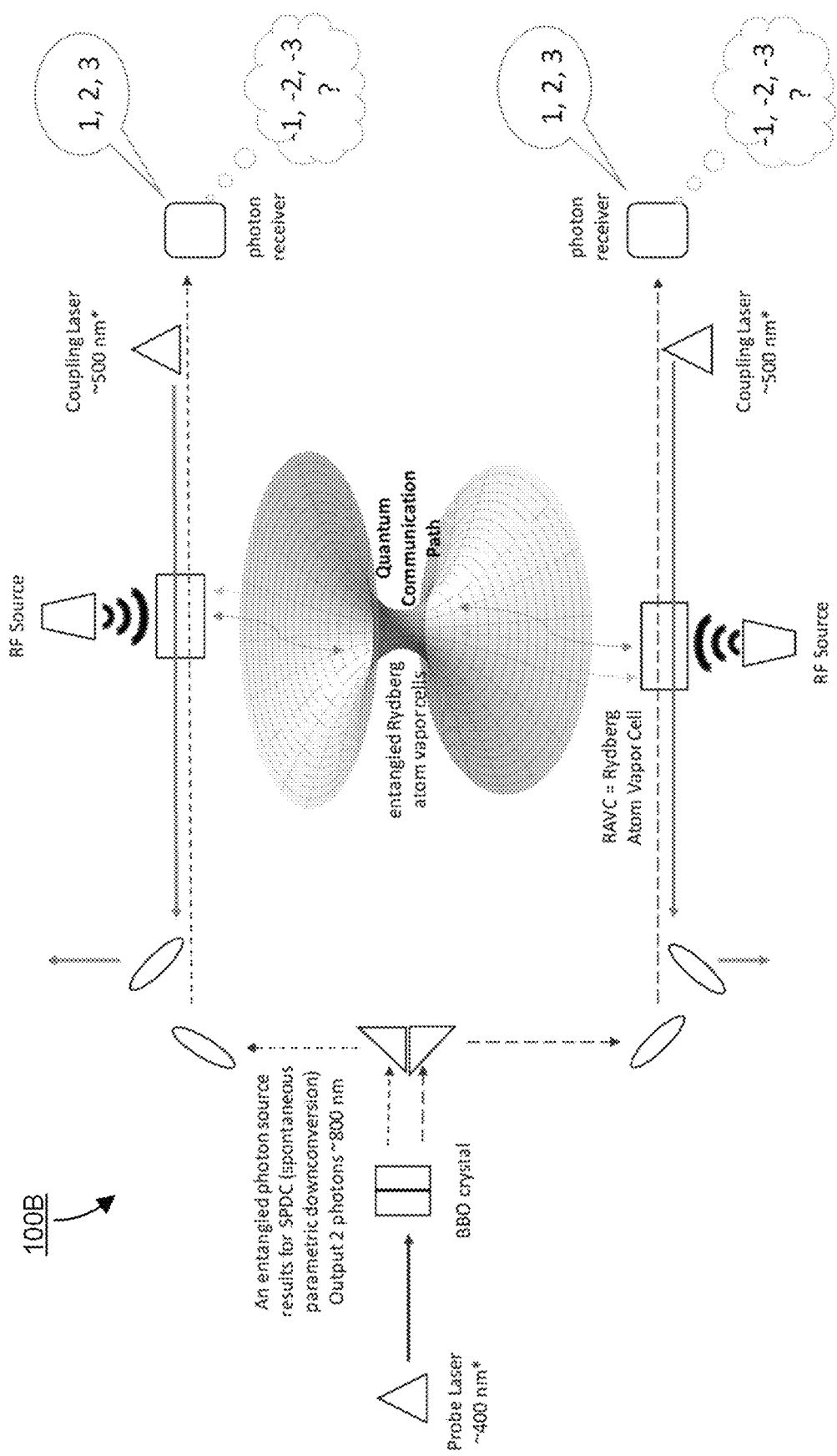

Any number of "translational" solutions may be provided to depending on the exact output of the receive side to from which to translated. FIG. 1B illustrates a system 100B using quantum entangled atomic states to communicate information, according to an example. As shown, the information received a second photon receiver may be an inverse of the information received at a first photon receiver, or vice versa. Thus, any number of translational algorithms or techniques may be applied to understand information received/transmitted between the entangled RF vapor cells, which, in some examples, may be considered quantum error correction.

Figure 2:
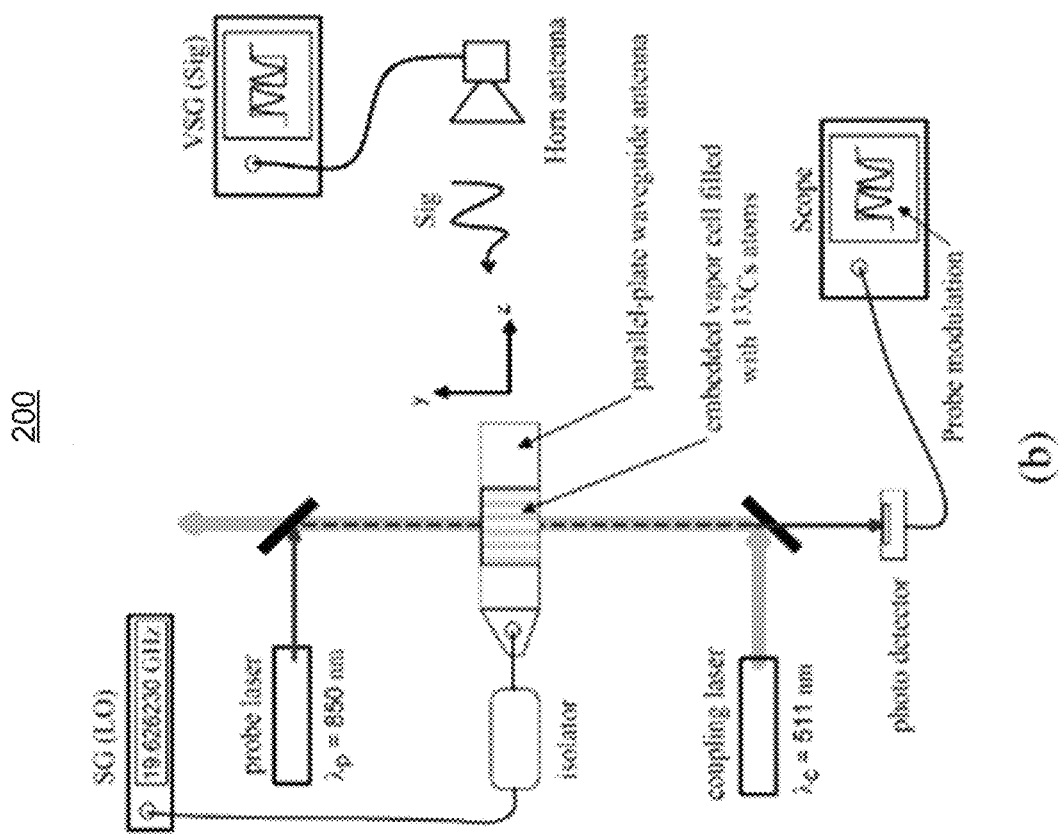
FIG. 2 illustrates a block diagram of a radio frequency (RF) sensor, according to an example.

FIG. 2 illustrates a block diagram 200 of a radio frequency (RF) sensor, according to an example. In some examples, the block diagram 200 may depict a Rydberg atom based RF sensor for use in system 100A or 100B described above. The block diagram 200 may depict an application of RAVCs as wide band RF e-field sensors. This principle of using RAVCs as RF e-field sensors may be used, in some examples, in a physical device which additionally utilizes entangled photons from the probe laser or optical pump source which creates the entangled or EPR state between the two spatially separated RAVCs as depicted in FIG. 1A.

Figure 3:
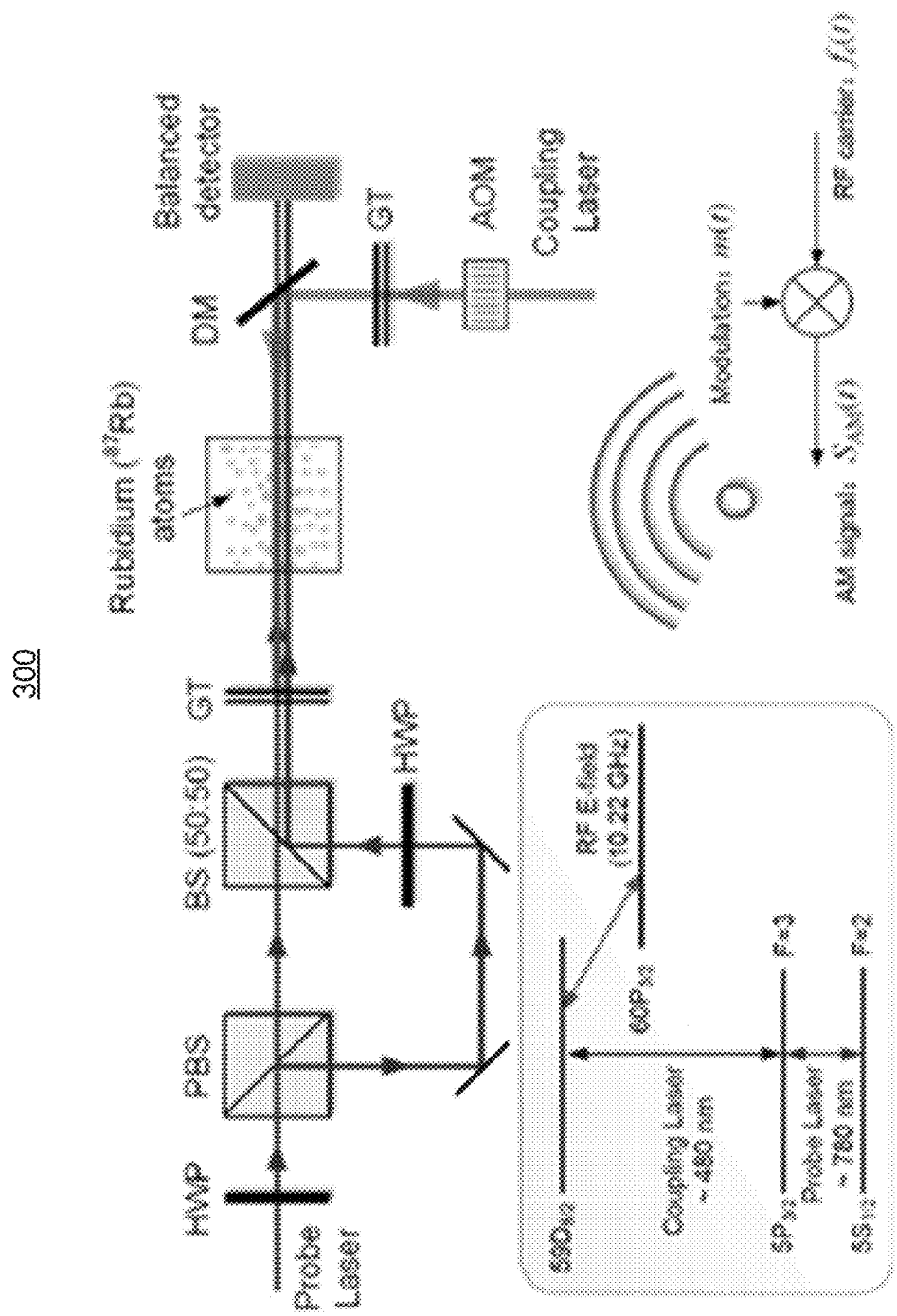
FIG. 3 illustrates a block diagram of an experimental setup of transferring entangled photon states to atoms, according to an example.

FIG. 3 illustrates a block diagram 300 of an experimental setup for transferring the superposition state of a photon to an atomic ion, according to an example. As shown, the block diagram 300 may be of an experimental setup of a magnetic field to trap an atomic ion. Here, two lasers may be focused on the ion, one as an experimental photon emitter for specific polarization, and the other to help maintain coherence. As shown, photon detectors may be arranged to catch or receive photon emissions from the ion indicating the transfer of the superposition state from the photon emitting laser to the ion. In other iterations, this may be used to demonstrate entangled partner photons resulting from SPDC being absorbed by two spatially-separated ions to demonstrate photon-to-atom entanglement transfers. In other words, any number or varieties of data communications applications may be provided using this new family of communications solutions based on entangled quantum atomic states.

Figure 4:
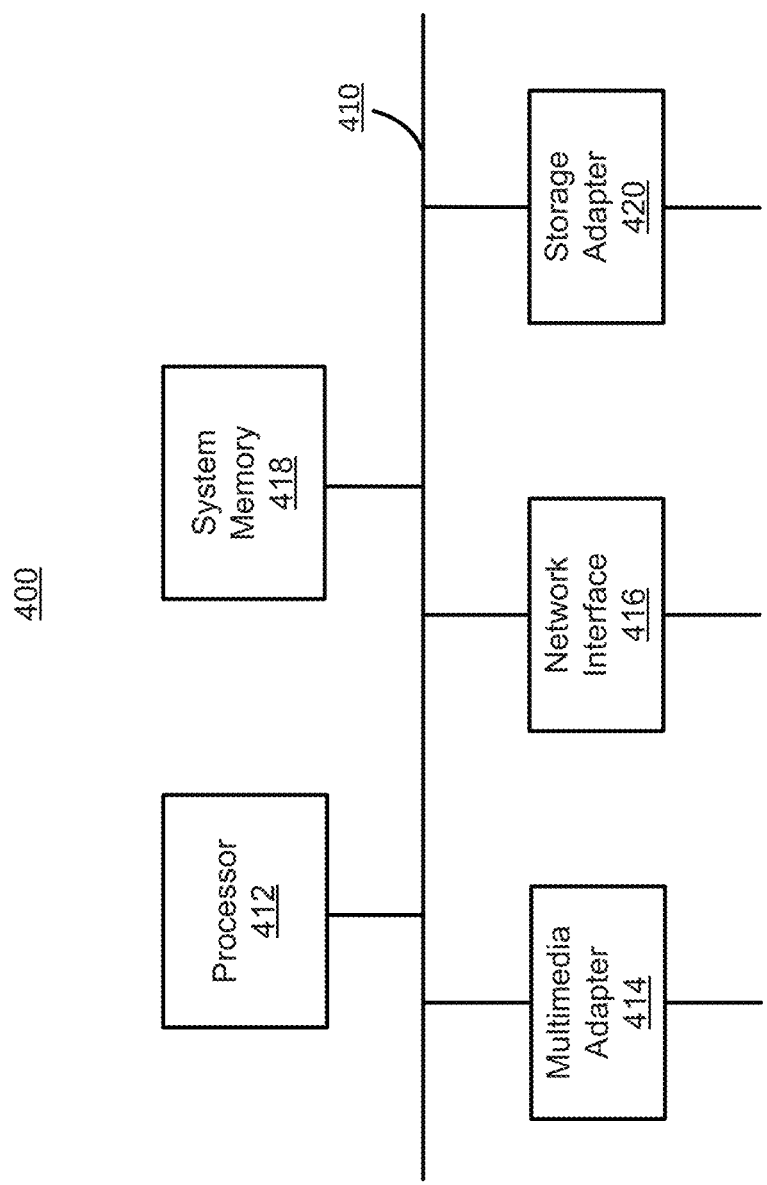
FIG. 4 illustrates a block diagram of a computer system using a communication transceiver quantum entangled atomic states, according to an example.

FIG. 4 illustrates a block diagram 400 of a computer system using a communication transceiver quantum entangled atomic states, according to an example. The computer system 400 may be part of, used by, or used with system 100 to perform the functions and features described herein. The computer system 400 may include, among other things, an interconnect 410, a processor 412, a multimedia adapter 414, a network interface 416, a system memory 418, and a storage adapter 420.

The interconnect 410 may interconnect various subsystems, elements, and/or components of the computer system 400. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 410 may allow data communication between the processor 412 and system memory 418, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 412 may be the central processing unit (CPU) of the computing device and may control overall operation of the computing device. In some examples, the processor 412 may accomplish this by executing software or firmware stored in system memory 418 or other data via the storage adapter 420. The processor 412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include a devices associated with visual (e.g., video card or display), audio (e.g., sound card or speakers), and/or various input/output interfaces (e.g., mouse, keyboard, touchscreen). It should be appreciated that the multimedia adapter 414 may include a translation element to/from RF signals and to/from photonic signals for the systems and methods described herein.

The network interface 416 may provide the computing device with an ability to communicate with a variety of remote devices over a network and may include, for example, an Ethernet adapter, a Fiber Channel adapter, and/or other wired- or wireless-enabled adapter. The network interface 716 may provide a direct or indirect connection from one network element to another, and facilitate communication and between various network elements.

The storage adapter 420 may connect to a standard computer-readable medium for storage and/or retrieval of information, such as a fixed disk drive (internal or external).

Many other devices, components, elements, or subsystems (not shown) may be connected in a similar manner to the interconnect 410 or via a network. Conversely, all of the devices shown in FIG. 4 need not be present to practice the present disclosure. The devices and subsystems can be interconnected in different ways from that shown in FIG. 4. Code or computer-readable instructions to implement the dynamic approaches for payment gateway selection and payment transaction processing of the present disclosure may be stored in computer-readable storage media such as one or more of system memory 418 or other storage. Code or computer-readable instructions to implement the dynamic approaches for payment gateway selection and payment transaction processing of the present disclosure may also be received via one or more interfaces and stored in memory. The operating system provided on computer system 400 may be MS-DOS®, MS-WINDOWS®, OS/2®, OS X®, IOS®, ANDROID®, UNIX®, Linux®, or another operating system.

It should be appreciated that the block diagram 400 of the computer system using a communication transceiver quantum entangled atomic states, as described above, may provide communication of data to take place through any varieties of communication channels or mediums. The quantum communication path, as shown in FIGS. 1A-1B are illustrative to show that the communication link may be provided beyond conventional links using copper, fiber, or RF signal (where RF signal is an intermediary connection in this device). Although generally depicted in free-space, the communication link provided by the systems and methods described herein may be secure and private. In some examples, the communication link provided by quantum states of entangled atoms may be essentially "hack-proof" and may be considered to communication data or information nearly instantaneous. In some examples, the various elements described herein may be provided with a smaller form factor and placed within a transceiver configuration, which may have an input of fiber optic cable or free-space optical transceiver for the entangled portion of the device. Other variations may also be contemplated or provided.

For example, Rydberg atom vapor cells may sense RF in any number of practical applications. Examples of some applications may be outlined in "Rydberg Atoms for Radio-Frequency Communications and Sensing: Atomic Receivers for Pulsed RF Field and Phase Detection" by D. A. Anderson et al., Rydberg Technologies Inc., Ann Arbor, Mich. 48103 USA (18 Oct. 2019) and "A 'Real-Time' Guitar Recording using Rydberg Atoms and Electromagnetically Induced Transparency: Quantum Physics Meets Music" by Christopher L. Holloway et al., AIP Advances 9, 065110 (18 Jun. 2019), which are herein incorporated in their entireties.

The systems and methods described may provide several benefits over conventional communication systems. For example, the quantum communication transceiver may be a highly disruptive technology. It may create entire field of new a novel communication systems and protocols based on entangled quantum states. As described above, communications may have high speeds and prove nearly instantaneous communication links, only limited by the distance to maintain coherence of the photons maintaining the entangled Rydberg atom vapor cells. Furthermore, these communication links may be highly secure and nearly "un-hackable," as they are based on entangled particles. Furthermore, all equipment that would be necessary for implementation may generally be available. It should be appreciated that additional elements, components, or systems may be provided in order to maintain entanglement between the RAVCs and may be fine-tuned beyond the exact descriptions, but within the scope of the examples, described herein.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for various data communication applications as well as technology advances.

It should be appreciated that the systems and methods described herein may facilitate a new or novel approach to data communications using entangled quantum states. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the communications system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to data communication systems, it should be appreciated that the systems and methods described herein may also be used in other various systems and other implementations. For example, these may include test and measurement systems, calibration tools or techniques, or other similar applications. In fact, there may be numerous applications in wireless or wired communication networks, not to mention fiber-optic, sensor, electric, or satellite systems that could employ the systems and methods as well. One example is a quantum correlation assisted RF triangulation system. Weak RF signal received at both remote locations of the RVACs can be correlated based on signal strength and directionality creating a two point directional RF detection system. Conversely, the system can be used for detecting quantum correlated RF interference as well.

It should be appreciated that the systems and methods described herein may also be used to help provide, directly or indirectly, measurements for distance, angle, rotation, speed, position, wavelength, transmissivity, and/or other related data communications or calibration systems.

The examples described herein also provide new and improved communication systems. Ultimately, the systems and methods described herein may increase efficiency, reduce cost, maximize existing equipment, minimize adverse effects of traditional systems, and solve many of the technical challenges related to current communication systems.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
   a laser source for generating a photon;
   one or more optical elements to create a pair of entangled photons from the generated photon;
   a radio-frequency (RF) based element to generate a quantum communication path from the pair of entangled photons, wherein the radio-frequency (RF) based element generates the quantum communication path from the pair of entangled photons by creating two Rydberg atom vapor cells (RAVCs) that are entangled using spontaneous parametric down conversion (SPDC), and wherein the entangled photons transfer or communicate their entangled state to Rydberg atoms within the Rydberg atom vapor cells (RAVCs) and form at least one entangled link with the other, the communication path comprising the least one entangled link; and
   one or more photon receivers, using at least one translation technique, to translate entangled state of each of the Rydberg atom vapor cells (RAVCs).

2. The system of claim 1, wherein the laser source comprises at least one of a probe laser or a pump laser.

3. The system of claim 1, wherein the one or more optical elements comprises a crystal element made of barium-borate (BBO).

4. The system of claim 1, wherein the pair of entangled photons comprises a first entangled photon and a second entangled photon.

5. The system of claim 1, wherein the radio-frequency (RF) based element comprises a radio-frequency (RF) horn.

6. The system of claim 1, wherein the translation technique comprises an inverse translation technique.

7. A method of communication using a quantum communication link, comprising:
   generating, using a laser source, a photon;
   creating, using one or more optical elements, a pair of entangled photons from the generated photon;
   generating, using a radio-frequency (RF) based element, a quantum communication path from the pair of entangled photons, wherein the radio-frequency (RF) based element generates the quantum communication path from the pair of entangled photons by creating two Rydberg atom vapor cells (RAVCs) that are entangled using spontaneous parametric down conversion (SPDC), and
   wherein the entangled photons transfer or communicate their entangled state to Rydberg atoms within the Rydberg atom vapor cells (RAVCs) and form at least one entangled link with the other, the communication path comprising the least one entangled link; and
   using at least one translation technique, by one or more photon receivers, to translate entangled state of each of the Rydberg atom vapor cells (RAVCs) (RAVC).

8. The method of claim 7, wherein the laser source comprises at least one of a probe laser or a pump laser.

9. The method of claim 7, wherein the one or more optical elements comprises a crystal element made of barium-borate (BBO).

10. The method of claim 7, wherein the pair of entangled photons comprises a first entangled photon and a second entangled photon.

11. The method of claim 7, wherein the radio-frequency (RF) based element comprises a radio-frequency (RF) horn.

12. The method of claim 7, wherein the translation technique comprises an inverse translation technique.

13. A non-transitory computer-readable storage medium having an executable stored thereon, which when executed instructs a processor to:
   generate, using a laser source, a photon;
   create, using one or more optical elements, a pair of entangled photons from the generated photon;
   generate, using a radio-frequency (RF) based element, a quantum communication path from the pair of entangled photons, wherein the radio-frequency (RF) based element generates the quantum communication path from the pair of entangled photons by creating two Rydberg atom vapor cells (RAVCs) that are entangled using spontaneous parametric down conversion SPDC), and
   wherein the entangled photons transfer or communicate their entangled state to Rydberg atoms within the Rydberg atom vapor cells (RAVCs) and form at least one entangled link with the other, the communication path comprising the least one entangled link; and
   use at least one translation technique, by one or more photon receivers, to translate entangled state of each of the Rydberg atom vapor cells (RAVCs).

14. The non-transitory computer-readable storage medium of claim 13, wherein:
   the laser source comprises at least one of a probe laser or a pump laser;
   the one or more optical elements comprises a crystal element made of barium-borate (BBO);
   the radio-frequency (RF) based element comprises a radio-frequency (RF) horn; and
   the pair of entangled photons comprises a first entangled photon and a second entangled photon.

* * * * *

UNITED STATES PATENT AND TRADEMARK OFFICE
CERTIFICATE OF CORRECTION

| | |
|---|---|
| PATENT NO. | : 11,777,614 B2 |
| APPLICATION NO. | : 17/553413 |
| DATED | : October 3, 2023 |
| INVENTOR(S) | : Darren Scott Hamilton |

It is certified that error appears in the above-identified patent and that said Letters Patent is hereby corrected as shown below:

In the Claims

In Column 11, Line 25, Claim 7, "the Rydberg atom vapor cells (RAVCs) (RAVC)" should read "the Rydberg atom vapor cells (RAVCs)".

Signed and Sealed this
Twenty-sixth Day of March, 2024

Katherine Kelly Vidal
*Director of the United States Patent and Trademark Office*